(12) United States Patent
Mahnig et al.

(10) Patent No.: US 12,057,596 B2
(45) Date of Patent: Aug. 6, 2024

(54) BATTERY TRAY

(71) Applicant: GF Casting Solutions AG, Schaffhausen (CH)

(72) Inventors: Dominik Mahnig, Schaffhausen (CH); Roger Kupferschmid, Hemishofen (CH); Stefan Philipp, Gailingen (DE); Michael Just, Neunkirch (CH); Hasan Atasoy, Hohenroda (DE)

(73) Assignee: GF CASTING SOLUTIONS AG, Schaffhausen (CH)

( * ) Notice: Subject to any disclaimer, the term of this patent is extended or adjusted under 35 U.S.C. 154(b) by 739 days.

(21) Appl. No.: 17/117,164

(22) Filed: Dec. 10, 2020

(65) Prior Publication Data

US 2021/0184305 A1 Jun. 17, 2021

(30) Foreign Application Priority Data

Dec. 11, 2019 (EP) .................................. 19 215 281

(51) Int. Cl.

| | |
|---|---|
| *H01M 50/249* | (2021.01) |
| *H01M 10/613* | (2014.01) |
| *H01M 10/625* | (2014.01) |
| *H01M 10/6556* | (2014.01) |
| *H01M 50/207* | (2021.01) |
| *H01M 50/224* | (2021.01) |

(52) U.S. Cl.
CPC ....... *H01M 50/249* (2021.01); *H01M 10/613* (2015.04); *H01M 10/625* (2015.04); *H01M 10/6556* (2015.04); *H01M 50/207* (2021.01); *H01M 50/224* (2021.01); *H01M 2220/20* (2013.01)

(58) Field of Classification Search
CPC ............ H01M 50/249; H01M 50/207; H01M 10/613; H01M 10/625; H01M 10/6556
See application file for complete search history.

(56) References Cited

U.S. PATENT DOCUMENTS

| | | | |
|---|---|---|---|
| 2017/0104252 A1* | 4/2017 | Wünsche ............ | H01M 10/647 |
| 2020/0058967 A1* | 2/2020 | Berge .................. | H01M 50/211 |
| 2020/0127349 A1* | 4/2020 | Park .................. | H01M 10/6556 |

FOREIGN PATENT DOCUMENTS

| | | |
|---|---|---|
| CN | 110238368 A | 9/2019 |
| DE | 102015217810 A1 | 3/2017 |
| DE | 102017005329 A1 | 12/2018 |
| WO | WO 2019169080 A1 | 9/2019 |

* cited by examiner

*Primary Examiner* — Jonathan G Jelsma
(74) *Attorney, Agent, or Firm* — LEYDIG, VOIT & & MAYER, LTD.

(57) ABSTRACT

A battery tray is for at least one battery module for a motor vehicle. The at least one battery module has multiple battery cells. The battery tray includes: a plurality of modules, the modules including: a front module; a rear module; and at least one central module. The modules each include a base section and at least one wall section. Ducts for a cooling medium are arranged on or in the base section for each of the modules. The modules are each embodied as cast parts and are connected to one another by joining to form a closed, pressure-tight and medium-tight battery tray.

20 Claims, 2 Drawing Sheets

BATTERY TRAY

CROSS-REFERENCE TO PRIOR APPLICATIONS

Priority is claimed to European Patent Application No. EP 19 215 281.7, filed on Dec. 11, 2019, the entire disclosure of which is hereby incorporated by reference herein.

FIELD

The invention relates to a battery tray for at least one battery module for motor vehicles, preferably for electrically driven vehicles.

BACKGROUND

Motor vehicles that are equipped exclusively or at least in addition with an electric drive must be equipped with correspondingly large batteries in which the energy for the electric drive can be stored. In this case, the batteries themselves are accommodated in a battery tray, with the result that, on the one hand, they are protected against external weathering influences, and on the other hand however, substances that are contained in the batteries are prevented from discharging into the environment.

In this case, the size of a battery tray is governed according to the number of battery cells that are to be accommodated and also according to the installation space that is available in the vehicle.

Battery trays can be produced from metal sheets and profiles. A battery tray is characterized by means of a tray-shaped casing in which a plurality of battery cells are arranged. In order to ensure the battery tray is sufficiently rigid, a circumferential profile, which can simultaneously also function as a circumferential wall of the tray, is mainly arranged on the exterior. The requirements regarding leak tightness and production tolerances are high.

In addition, when the battery cells are operated at high temperatures, the battery cells experience an accelerated ageing process and consequently a shortened serviceable life. In order to counteract this disadvantageous effect, it an active cooling system can be provided in the form of a flow-through cooling duct on the tray.

The publication DE 10 2017 005 329 A1 discloses a method for producing a battery tray from metal sheets which can be adapted individually to the size of the required battery.

In this case, it is disadvantageous that an active cooling system is not provided on the tray.

The publication DE 10 2015 217 810 A1 discloses a housing for a battery, wherein an open duct is provided in the cast part and said open duct is covered by means of an additional plate. In this case, it is disadvantageous that the battery tray cannot be individually increased in size or adapted to the size of the battery since the duct run extends closed within itself and it cannot be expanded.

SUMMARY

An embodiment of the present invention provides a battery tray for at least one battery module for a motor vehicle. The at least one battery module has multiple battery cells. The battery tray includes: a plurality of modules, the modules including: a front module; a rear module; and at least one central module. The modules each include a base section and at least one wall section. Ducts for a cooling medium are arranged on or in the base section for each of the modules. The modules are each embodied as cast parts and are connected to one another by joining to form a closed, pressure-tight and medium-tight battery tray.

BRIEF DESCRIPTIONS OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

DETAILED DESCRIPTION

Figure 1:
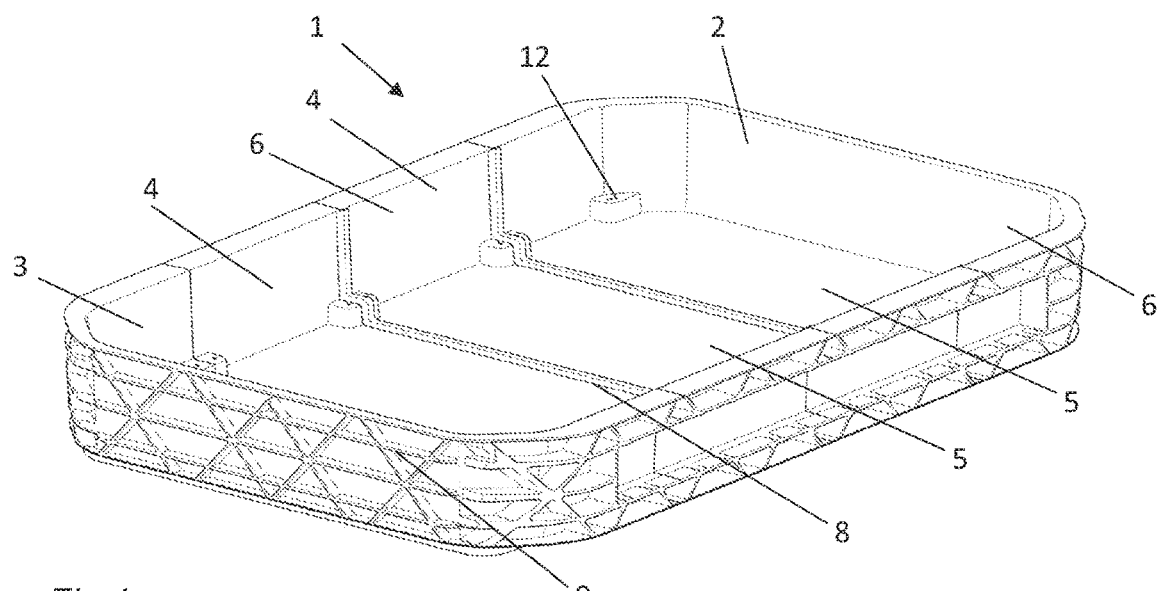
FIG. 1 illustrates a three dimensional view of a battery tray in accordance with an exemplary embodiment of the present invention.

An embodiment of the present invention provides a battery tray, which provides a system for cooling the battery, and the tray can be adapted to the different battery sizes or without additional investment costs larger and smaller battery trays can be produced.

Embodiments of the present invention provide advantages over known systems by virtue of the fact that the modules are embodied as cast parts and are connected by means of being joined to one another to form a closed, pressure-tight and medium-tight battery tray.

A battery tray in accordance with an embodiment of the present invention for at least one battery module for a motor vehicle, preferably for an electrically driven vehicle, wherein the battery module comprises multiple battery cells, includes a front module, a rear module, and at least one central module. The modules comprise, in each case, a base section and at least one wall section.

The front module and also the rear module comprise, preferably, a wall, which extends around the base section as far as the end face, which is embodied as a connecting region. In an alternative embodiment of the battery tray, the front module can represent the rear module or conversely. The central module comprises, on the two opposite-lying outer faces, in each case, a wall section, and is provided, on the two opposite-lying end faces, with a connecting region, which renders it possible to connect the modules to one another.

Ducts for the cooling medium are arranged, in each case, in or on the base section, the cooling medium flowing through the battery tray in accordance with the invention or the modules for cooling the battery.

The modules are embodied as cast parts and are connected by means of being joined to one another to form a battery tray, wherein the battery tray is medium-tight and pressure-tight.

The battery tray in accordance with the invention represents a closed tray, which is formed from multiple modules, and as a consequence, the size of the tray can be adjusted according to the size of the battery, in that, for example, the battery tray can be expanded by means of further central modules because the further central modules are compatible with one another on account of the uniform connecting region on the modules.

The ducts of the individual modules are connected to one another in a medium-tight and pressure-tight manner by virtue of the individual modules being joined to one another. The battery tray or the modules are also connected to one another in a medium-tight and pressure-tight manner in the connecting regions, with the result that fluid can neither flow into nor flow out of the battery tray.

It is preferred that the modules are each embodied as one piece or one part. The front module, the rear module, and also the central module are each embodied as a one-piece cast part with a base section and at least one wall section, wherein ducts for the cooling medium are arranged in or on the base section.

It has been shown to be advantageous if the modules are produced as pressure cast parts. This production method entails a high degree of precision with regard to the parts in order to ensure that the modules are compatible at the connecting regions.

In accordance with a preferred embodiment, the ducts for the cooling medium are arranged on the lower face of the base section. The ducts are each arranged in or on the module or are integrated in the one-piece cast part.

It is preferred that the ducts have a closed cross section. The ducts are preferably formed from a cast material or the hollow chamber through which the cooling medium flows is directly surrounded by the cast material.

It is advantageous if at least one module of the mutually connected modules has on at least one end face a connecting region by means of which the modules can be connected to one another. The connecting region is consequently a compatible interface of the modules with respect to one another.

It is advantageous if the connecting regions have a stepped arrangement or an offset arrangement or a ledge which extends longitudinally along the connecting region and the mutually connected modules overlap in the connecting region.

A preferred embodiment has shown itself to be if the mutually connected modules are joined in the overlapping connecting region by means of a welding method, rivets, screws and/or adhesive. These types of joining methods ensure the required medium-tightness and pressure-tightness. Naturally further joining techniques are also possible provided that they ensure the connection is medium-tight and pressure-tight.

It is advantageous that the wall sections have ribbing which reinforces the wall and increases the strength of the battery tray.

It is preferred that the battery tray comprises connecting ducts, wherein the connecting ducts are each embodied as separate parts. The connecting ducts which connect the ducts of the modules to one another are not integrated in the modules but rather are embodied as separate parts and are arranged on the battery tray. It is preferred that the connecting ducts are arranged respectively on the end face of the ducts in order to connect them to one another. The ducts can be connected to one another with the aid of connecting ducts in series or in parallel.

It is preferred that the ducts for the cooling medium extend in parallel and are connected to one another by means of respectively one connecting duct at the two ends of the ducts.

It is advantageous if the connecting ducts are embodied from a synthetic material or metal sheets. These can then be joined to the modules.

An embodiment of the invention is in addition characterized by virtue of the fact that the modules in accordance with embodiments of the invention are produced from an aluminium alloy or magnesium alloy. This ensures a low as possible weight together with a high degree of rigidity and strength and also efficient thermal conductivity in order to efficiently cool the battery.

All the embodiment possibilities can be freely combined with one another.

FIG. 1 illustrates a battery tray 1 in accordance with an embodiment of the present invention for motor vehicles, preferably for electrically driven motor vehicles. The battery tray 1 in accordance with the invention is used to receive a battery module, wherein the battery module comprises multiple battery cell modules. The battery tray 1 in accordance with the invention includes a front module 2, a rear module 3 and at least one central module 4. The modules 2, 3, 4 comprise in each case a base section 5 and at least one wall section 6. The modules 2, 3, 4 are each embodied as one-piece cast parts, preferably a pressure casting. Ducts 7 for the cooling medium for cooling the battery module are arranged in or on the base sections 5 of the modules 2, 3, 4. In addition, the modules 2, 3, 4 preferably comprise a battery cell module attachment point 12 in order to fix the battery cells in the battery tray 1. The modules 2, 3, 4 are joined to one another at the connecting regions 8. It is possible by means of the connecting regions 8, which are compatible with one other, to customize the battery tray 1 according to the battery module that is to be installed. In other words, it is possible as required to install further central modules 4 in order to increase the size of the battery tray 1 accordingly. The embodiment illustrated in FIGS. 1 to 3 of a battery tray 1 comprises two central modules 4 but it is also possible to install only one or still further central modules 4. The modules 2, 3, 4 comprise wall sections 6, wherein the front module 2 and the rear module 3 comprise a wall section 6 that extends as far as the connecting region 8 and the central module 4 comprises two opposite-lying wall sections 6. Clearly apparent is also the ribbing 9 of the wall sections 6, which ensures the rigidity and strength of the tray 1.

Figure 2:
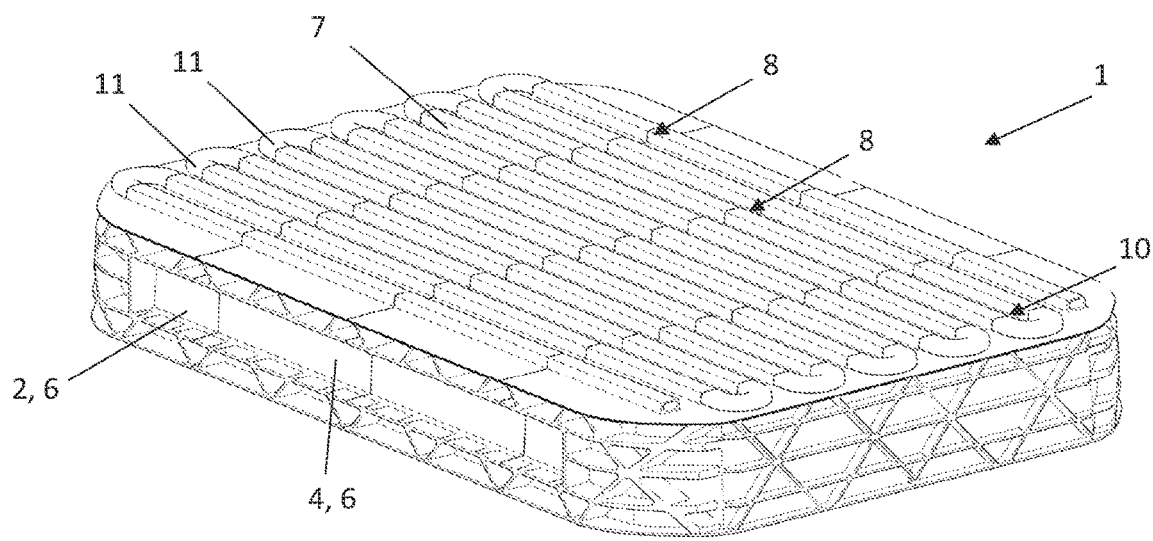
FIG. 2 illustrates a three dimensional view of a battery tray in accordance with an exemplary embodiment of the present invention from below, wherein the ducts are connected to one another in series.

The ducts 7 for the cooling medium are clearly apparent in FIG. 2, wherein said ducts are arranged on the lower face of the base section 5 of the modules 2, 3, 4. The ducts 7 are integrated in the module 2, 3, 4 or in the one-piece cast part. The ducts 7 have a closed cross section, the hollow chamber 14 that is formed is consequently surrounded by the cast material. The ducts 7 extend in parallel and are connected by way of the connecting regions 8 in a medium-tight and pressure-tight manner to the ducts 7 of the attached module 2, 3, 4.

Figure 3:
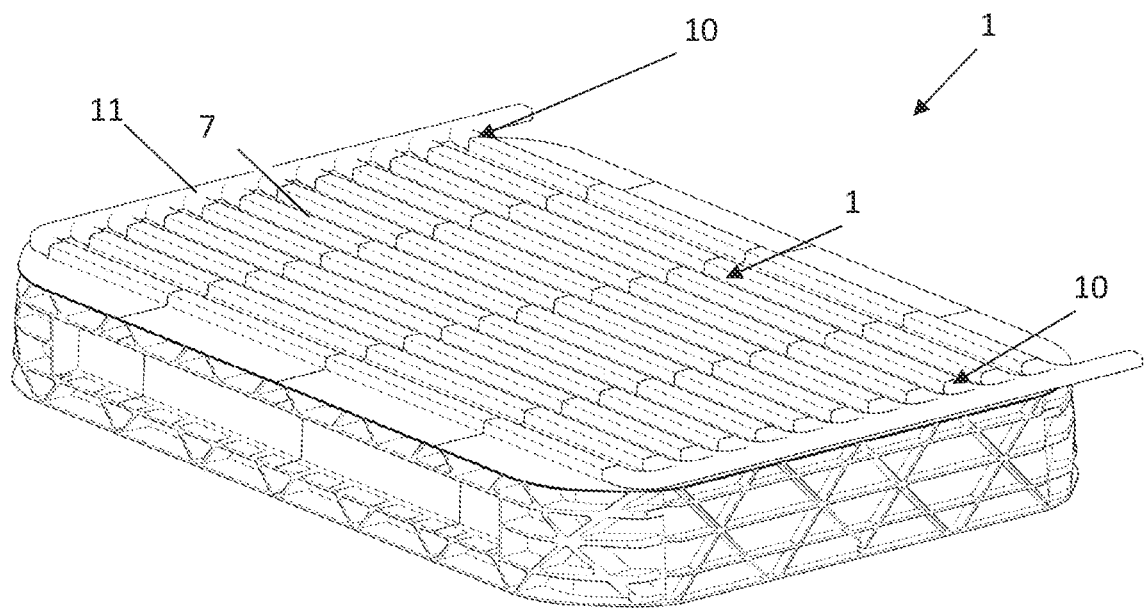
FIG. 3 illustrates a three dimensional view of a battery tray in accordance with an exemplary embodiment of the present invention from below, wherein the ducts are connected to one another in parallel.

In order to connect the ducts 7 in parallel or in series to one another connecting ducts 11 are arranged on the ends 10 of the ducts 7 that are arranged respectively on the rear module and front module. The connecting duct 11 is embodied as a separate part and is attached to the assembled modules 2, 3 or to the front module 2 and the rear module 3 or to the ends 10 of the ducts 7, likewise in a medium-tight and pressure-tight manner. FIG. 2 illustrates a connection of the ducts 7 to the connecting ducts 11 which renders it possible to connect the ducts 7 in series, wherein in the illustrated embodiment the connecting ducts are embodied as individual bends and are arranged on the module 2, 3. Naturally the separate bends can also be embodied as one part in order to reduce the outlay during the assembly procedure, wherein the flow duct of the bends is not connected to one another in order to generate a series through-flow. FIG. 3 illustrates one embodiment of the connecting duct 11, in which the ducts 7 are connected in parallel to the connecting duct 11.

Figure 4:
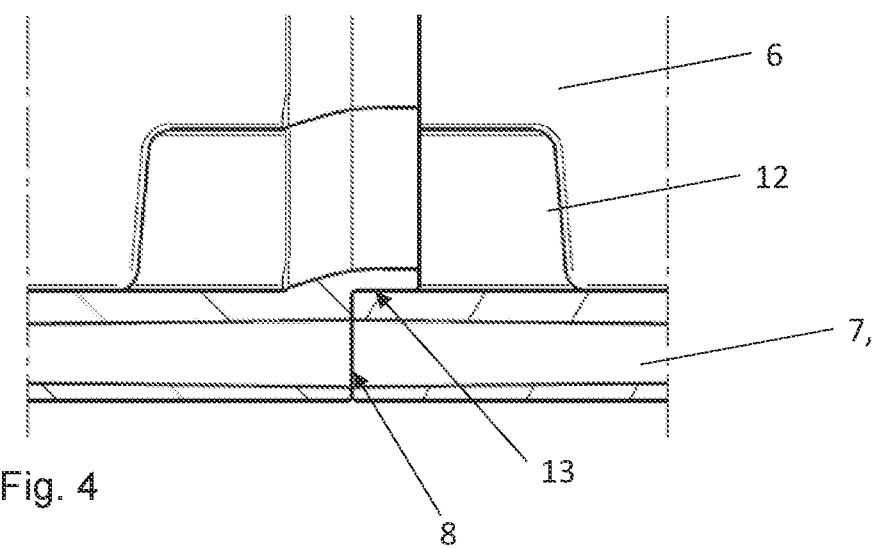
FIG. 4 illustrates a sectional view through the connecting region of two modules.

FIG. 4 illustrates a sectional view through a connecting region 8 between two modules 2, 3, 4. It is clearly apparent that an offset arrangement 13 is arranged in one module 2, 3, 4 and said offset arrangement extends over the length at least of one end face of a module. As a consequence, the two modules overlap one another in the connecting region. It is preferred that the modules 2, 3, 4 are also joined to one another along the connecting region 8 by means of a welding method, rivets, screws, adhesive and/or a further joining means that renders it possible to provide a medium-tight and pressure-tight connection.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Battery tray
2 Front module
3 Rear module
4 Central module
5 Base section
6 Wall section
7 Ducts
8 Connecting region
9 Ribbing
10 Duct ends
11 Connecting duct
12 Battery cell module attachment point
13 Offset arrangement
14 Hollow chamber ducts

The invention claimed is:

1. A battery tray for a motor vehicle, the battery tray comprising:
   a plurality of modules, the modules comprising:
      a front module;
      a rear module; and
      at least one central module,
   wherein the modules each comprise a base section having ducts for a cooling medium and at least one wall section,
   wherein the ducts are formed as part of the base section for each of the modules, and
   wherein the modules are each embodied as unitary cast parts and are interconnected by joining to form a closed, pressure-tight and medium-tight battery tray.

2. The battery tray as claimed in claim 1, wherein the modules are each embodied, individually, as one piece or one part.

3. The battery tray as claimed in claim 1, wherein the modules are embodied as pressure cast parts.

4. The battery tray as claimed in claim 1 wherein, for each of the modules, the ducts for the cooling medium are arranged on a lower face of the base section.

5. The battery tray as claimed in claim 1, wherein, for each of the modules, the ducts have a closed cross section.

6. The battery tray as claimed in claim 1, wherein the plurality of modules includes mutually connected pairs of the modules, and wherein at least one of the modules of each of the mutually connected pairs of modules comprises on at least one end face a connecting region by which the modules of the mutually connected pair of modules are connected to one another.

7. The battery tray as claimed in claim 6, wherein the connecting region comprises an offset arrangement and the modules of each of the mutually connected pairs of modules overlap in the connecting region.

8. The battery tray as claimed in claim 6, wherein the modules of each of the mutually connected pairs of modules are joined in the overlapping connecting region by a weld, rivets, screws, or an adhesive.

9. The battery tray as claimed in claim 6, wherein the ducts of each module of each of the mutually connected pairs of modules extend orthogonal to each connecting region and include an opening at each connecting region, and wherein the ducts of each module of each of the mutually connected pairs of modules are connected via the opening at each connecting region.

10. The battery tray as claimed in claim 1, wherein, for each of the modules, the wall sections have ribbing.

11. The battery tray as claimed in claim 1 wherein, for each of the modules, the ducts for the cooling medium extend in parallel and are connected to one another respectively at two ends of the ducts by connecting ducts.

12. The battery tray as claimed in claim 11, wherein, for each of the modules, the connecting ducts connect the ducts to one another in parallel or in series.

13. The battery tray as claimed in claim 12, comprising a first consolidated duct and a second consolidated duct, the first consolidated duct joining a first end of each row of ducts of the battery tray and the second consolidated duct joining a second end of each row of the ducts of the battery tray that opposes the first end.

14. The battery tray as claimed in claim 13, wherein battery tray comprises only two fluid connections into the ducts, and wherein the first consolidated duct and the second consolidated duct comprise each comprise one of the two fluid connections.

15. The battery tray as claimed in claim 12, wherein the ducts form a single flow path through the entire battery tray, and wherein the single flow path includes one inlet and one outlet.

16. The battery tray as claimed in claim 11, wherein, for each of the modules, the connecting ducts are each embodied as separate parts.

17. The battery tray as claimed in claim 11, wherein, for each of the modules, the connecting ducts are embodied from a synthetic material or metal sheets.

18. The battery tray as claimed in claim 1, wherein the modules are produced from an aluminium alloy or a magnesium alloy.

19. A method for producing a battery tray for a motor vehicle, the method comprising:

casting a front module, a rear module, and at least one central module of the battery tray, each of the front module, the rear module, and the at least one central modules including a base section having ducts configured to receive a cooling medium and at least one wall section; and joining the front module to the at least one central module and joining the rear module to the at least one central module to interconnect the ducts of each module and thereby form a closed, pressure-tight and medium-tight battery tray.

20. The method as claimed in claim 19, wherein the casting of the front module, the rear module, and the at least one central module comprising, casting the front module as one piece or one part, casting the rear module as one piece or one part, and casting at least one of the at least one central module as one piece or one part.

* * * * *